United States Patent

Slavens et al.

(10) Patent No.: US 10,196,924 B2
(45) Date of Patent: Feb. 5, 2019

(54) CONDUIT COOLING SYSTEM AND METHOD OF SUPPLYING COOLING FLUID TO A CONDUIT

(71) Applicant: United Technologies Corporation, Farmington, CT (US)

(72) Inventors: Thomas N. Slavens, Moodus, CT (US); Carey Clum, East Hartford, CT (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 659 days.

(21) Appl. No.: 14/827,889

(22) Filed: Aug. 17, 2015

(65) Prior Publication Data

US 2017/0051628 A1 Feb. 23, 2017

(51) Int. Cl.
| | | |
|---|---|---|
| F02C 7/18 | (2006.01) | |
| F01D 17/10 | (2006.01) | |
| F01D 5/18 | (2006.01) | |
| F01D 25/10 | (2006.01) | |
| F01D 25/12 | (2006.01) | |

(52) U.S. Cl.
CPC ............ *F01D 17/105* (2013.01); *F01D 5/18* (2013.01); *F01D 25/10* (2013.01); *F01D 25/12* (2013.01); *F02C 7/185* (2013.01); *F05D 2220/32* (2013.01); *F05D 2260/213* (2013.01); *F05D 2260/606* (2013.01); *F05D 2270/3013* (2013.01); *F05D 2270/3015* (2013.01)

(58) Field of Classification Search
CPC .......... F02C 7/185; F01D 25/12; F01D 25/10; F01D 17/105; F01D 5/18; F28F 2250/06

USPC ........................................ 165/280, 282, 297
See application file for complete search history.

(56) References Cited

U.S. PATENT DOCUMENTS

| | | | |
|---|---|---|---|
| 2005/0241320 A1 | 11/2005 | Blonn et al. | |
| 2010/0186943 A1* | 7/2010 | Sun .................. | F01D 25/18 165/299 |
| 2011/0088405 A1* | 4/2011 | Turco .................. | F01D 5/081 60/782 |

FOREIGN PATENT DOCUMENTS

| | | | | |
|---|---|---|---|---|
| DE | 1776089 A1 * | 9/1971 | ............. | B01D 51/10 |
| GB | 2523324 A | 8/2015 | | |

OTHER PUBLICATIONS

European Search Report for International Application No. 16174983.3; International Filing Date: Jun. 17, 2016; dated Jan. 2, 2017; 8 pages.

* cited by examiner

*Primary Examiner* — Jason Shanske
*Assistant Examiner* — Sabbir Hasan
(74) *Attorney, Agent, or Firm* — Cantor Colburn LLP

(57) ABSTRACT

A conduit system for a gas turbine engine includes, a heat exchanger configured to cool fluid flowing therethrough having an inlet and an outlet, at least one by-pass in operable communication with the heat exchanger that is configured to allow fluid to exit the heat exchanger before reaching the outlet, and a conduit that is in fluidic communication with the outlet and the at least one by-pass.

10 Claims, 4 Drawing Sheets

CONDUIT COOLING SYSTEM AND METHOD OF SUPPLYING COOLING FLUID TO A CONDUIT

STATEMENT OF FEDERAL SUPPORT

This invention was made with government support with the United States Navy under Contract No. N00014-09-D-0821-0006. The government therefore has certain rights in this invention.

BACKGROUND

Some turbine engines employ heat exchanges to cool fluid that flow through turbine components to cool the components. Such systems work well for the purpose for which they were designed. However, those who practice in the industry are always receptive to new systems and methods for heat transferring engine parts.

BRIEF DESCRIPTION

Disclosed herein is a conduit system for a gas turbine engine is provided, wherein a heat exchanger is configured to cool or heat fluid flowing therethrough has an inlet and an outlet, at least one by-pass in operable communication with the heat exchanger is configured to allow fluid to exit the heat exchanger before reaching the outlet, and a conduit is in fluidic communication with the outlet and the at least one by-pass.

In addition to one or more of the features described above, or as an alternative, in further embodiments a valve is in fluidic communication with the at least one by-pass to adjust fluid flow through the at least one by-pass.

In addition to one or more of the features described above, or as an alternative, in further embodiments wherein the conduit is a blade of a turbine engine.

In addition to one or more of the features described above, or as an alternative, in further embodiments wherein pressure drop between the inlet and the at least one by-pass is less than pressure drop between the inlet and the outlet.

In addition to one or more of the features described above, or as an alternative, in further embodiments wherein a change in fluid temperature between the inlet and the at least one by-pass is less than a change in fluid temperature between the inlet and the outlet.

In addition to one or more of the features described above, or as an alternative, in further embodiments wherein at least one by-pass is a plurality of by-passes and each of the plurality of by-passes allows fluid to exit the heat exchanger after passing through a different portion of the heat exchanger.

In addition to one or more of the features described above, or as an alternative, in further embodiments wherein flow through each of the plurality of by-passes can be adjusted independently to allow control over pressure and temperature of fluid supplied to the conduit; and wherein the conduit is supplied fluid from the outlet and the at least one by-pass.

In addition to one or more of the features described above, or as an alternative, in further embodiments wherein pressure of fluid supplied to the conduit prevents reversing of flow through openings in the conduit.

Further disclosed herein is a conduit system that includes, a plurality of heat exchangers configured to cool or heat fluid flowing therethrough from a common source to an outlet, a valve in operable communication with each of the plurality of heat exchangers configured to adjust flow through the one of the heat exchangers the valve is in operable communication with. At least one by-pass is configured to allow fluid from the common source to by-pass all of the plurality of heat exchangers, a by-pass valve in operable communication with the by-pass configured to adjust flow through the by-pass, and a conduit is in fluidic communication with the by-pass and the outlet of at least one of the plurality of heat exchangers.

In addition to one or more of the features described above, or as an alternative, in further embodiments each of the plurality of heat exchangers has different characteristics regarding pressure drops versus flow therethrough.

In addition to one or more of the features described above, or as an alternative, in further embodiments each of the plurality of heat exchangers has different characteristics regarding heat transferring of fluid flowing therethrough.

Further disclosed herein is a method of supplying heat transferring fluid to a conduit is provided that includes, directing fluid into a heat exchanger; directing at least some of the fluid out of the heat exchanger via at least one by-pass prior to traversing completely through the heat exchanger, and directing at least some of the fluid that flowed out the at least one by-pass into a conduit to be cooled or heated.

In addition to one or more of the features described above, or as an alternative, in further embodiments, flowing fluid through a plurality of the at least one by-passes prior to traversing completely through the heat exchanger.

In addition to one or more of the features described above, or as an alternative, in further embodiments balancing flow through the at least one exit and an outlet of the heat exchanger according to a desired pressure differential of the fluid being cooled or heated.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Figure 1:
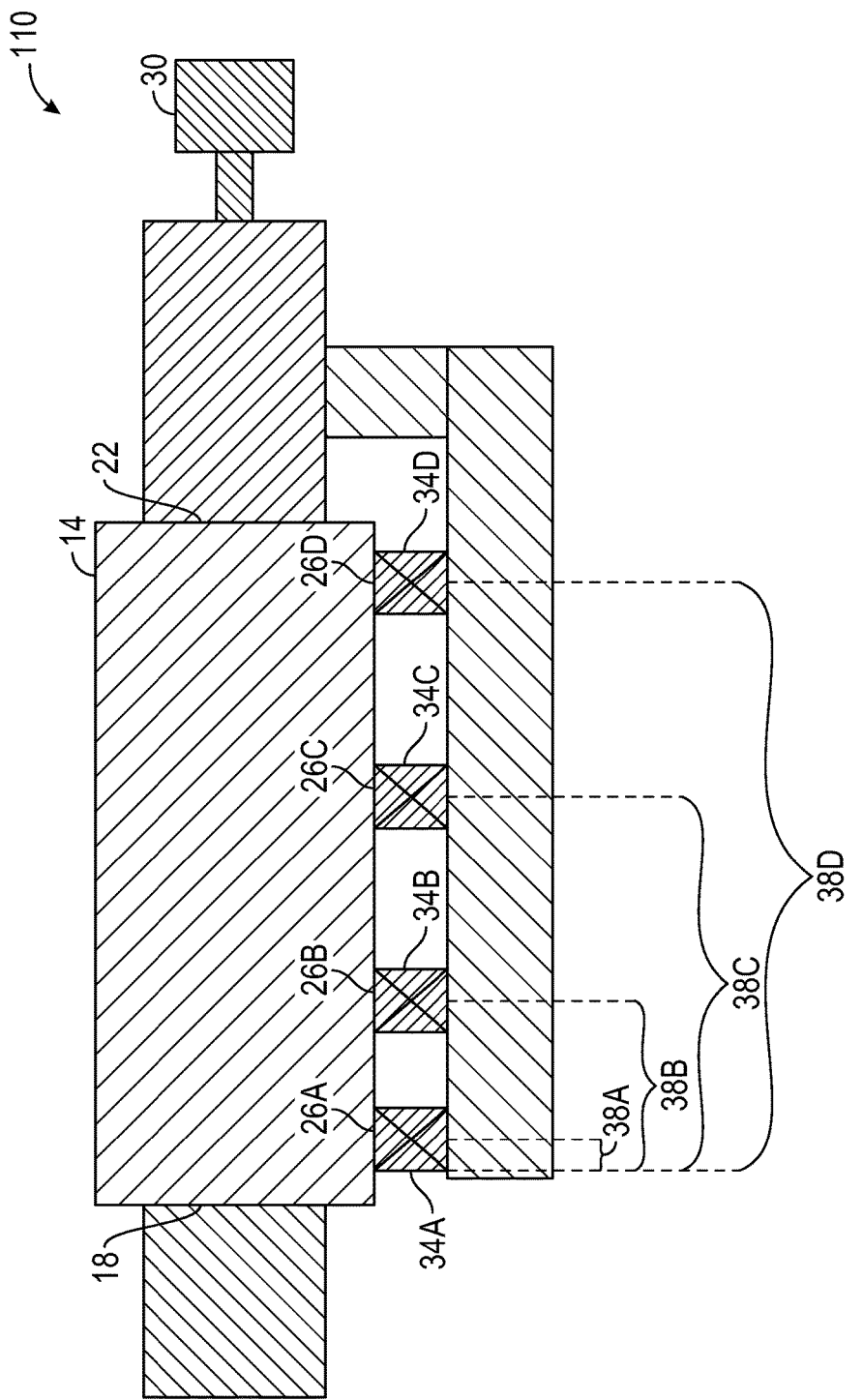
FIG. 1 depicts a schematic view of a conduit heat transferring system disclosed herein.

Referring to FIG. 1, a schematic of an embodiment of a conduit heat transferring system disclosed herein is illustrated at 10. The system 10 includes a heat exchanger 14 configured to cool or heat fluid flowing therethrough. The heat exchanger 14 has an inlet 18 and an outlet 22. At least one by-pass 26A-D, with four being shown in one embodiment although any practical number could be employed, are in operable communication with the heat exchanger 14 and are configured to allow fluid to exit the heat exchanger 14 before reaching the outlet 22. A conduit 30 is in fluidic communication with the outlet 22 and the by-passes 26A-D such that the conduit 30 is supplied fluid from both the outlet 22 and the by-passes 26A-D.

Additionally, valves 34A-D are in fluidic communication with each of the by-passes 26A-D and are configured to adjust fluid flow through the by-passes 26A-D that each of the valves 34A-D are in fluidic communication with. The by-passes 26A-D are positioned to allow fluid to exit the heat exchanger 14 after passing through different portions 38A-D of the heat exchanger 14. The portions 38A-D are selected to create pressure drops between the inlet 18 and the by-passes 26A-D that are less than the pressure drop between the inlet 18 and the outlet 22. Similarly, the portions 38A-D are further selected to create changes in fluid temperature between the inlet 18 and the by-passes 26A-D that are less than the change in fluid temperature between the inlet 18 and the outlet 22. The valves 34A-D in one embodiment are configured to be independently infinitely variable. As such, the system 10 allows control over pressure and temperature of fluid supplied to the conduit 30.

The conduit heat transferring system 10 allows an operator to supply heat transferring fluid to the conduit 30, by flowing fluid into the heat exchanger 14 and out of the heat exchanger 14 via at least one of the by-passes 34A-D prior to traversing completely through the heat exchanger 14. Fluid that flows out of any one or multiple of the by-passes 34A-D can then flow into the conduit 30 and cool or heat the conduit 30 in the process. The valves 34A-D allow for a wide variety of mixing of fluid at various temperatures and pressures to be ported to the conduit 30 via the by-passes 34A-D and outlet 22. The mixing can include supplying heat transferring fluid to the conduit 30 by balancing flow through the by-passes 34A-D and the outlet 22 of the heat exchanger 14 according to a desired pressure differential of fluid being cooled or heated.

Figure 2:
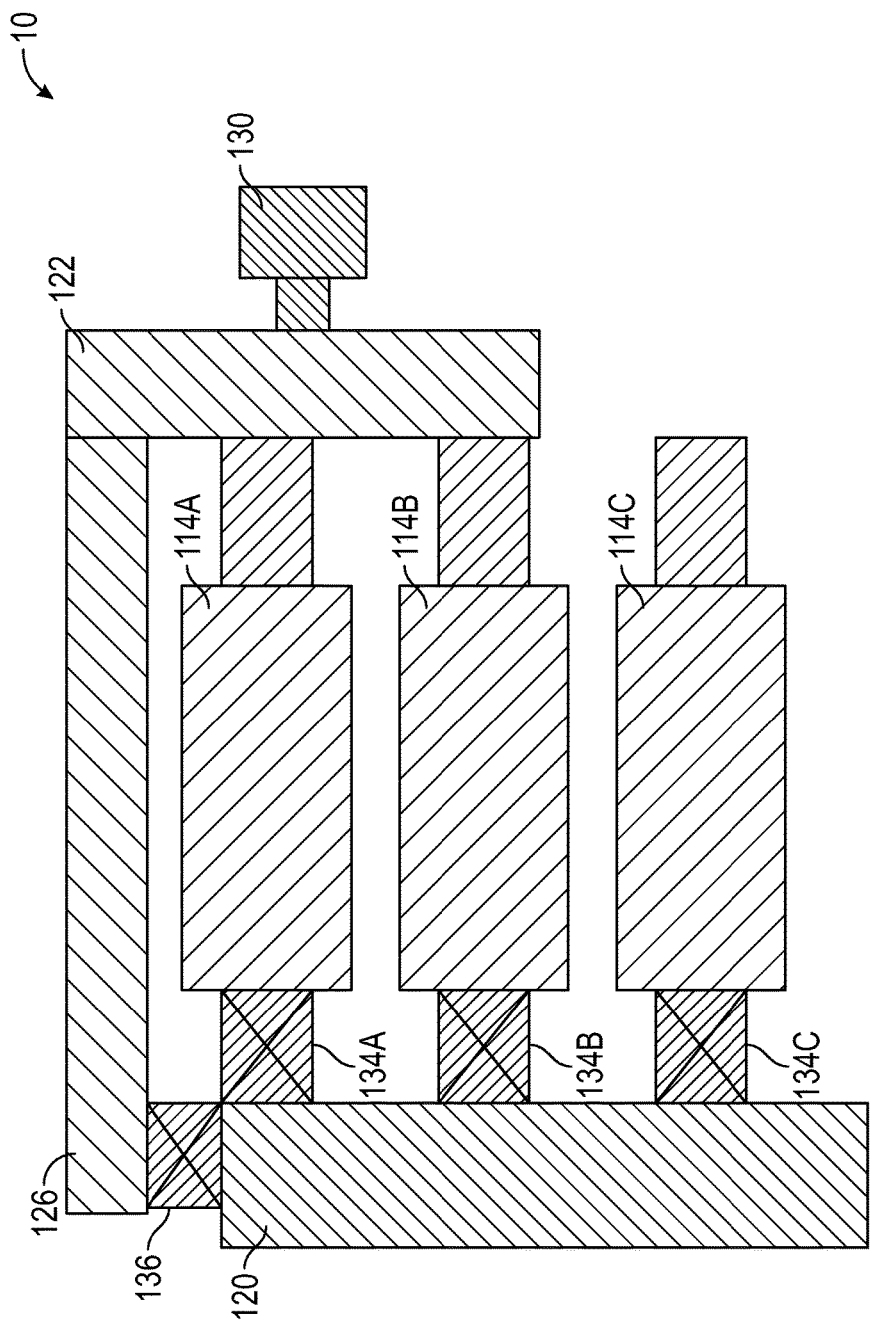
FIG. 2 depicts a schematic view of an alternative conduit heat transferring system disclosed herein.

Referring to FIG. 2, a schematic of an alternative embodiment of a conduit heat transferring system disclosed herein is illustrated at 110. The system 110 includes a plurality of heat exchangers 114A-C, with three of the heat exchangers being shown that are configured to cool or heat fluid flowing therethrough from a common source 120 to an outlet 122. A valve 134A-C in operable communication with each of the plurality of heat exchangers 114A-C is configured to adjust flow through the one of the heat exchangers that the valve is in operable communication with. At least one by-pass 126 is configured to allow fluid from the common source 120 to by-pass all of the plurality of heat exchangers 114A-C, and a by-pass valve 136 is in operable communication with the by-pass 126 to adjust flow through the by-pass 126. A conduit 130 is supplied fluid from the by-pass 126 and the outlet 122 of at least one of the plurality of heat exchangers 114A-C. Additionally, each of the heat exchangers 114A-C has different characteristics regarding pressure drops versus flow therethrough as well as different characteristics regarding heat transferring of fluid flowing therethrough.

Figure 3:
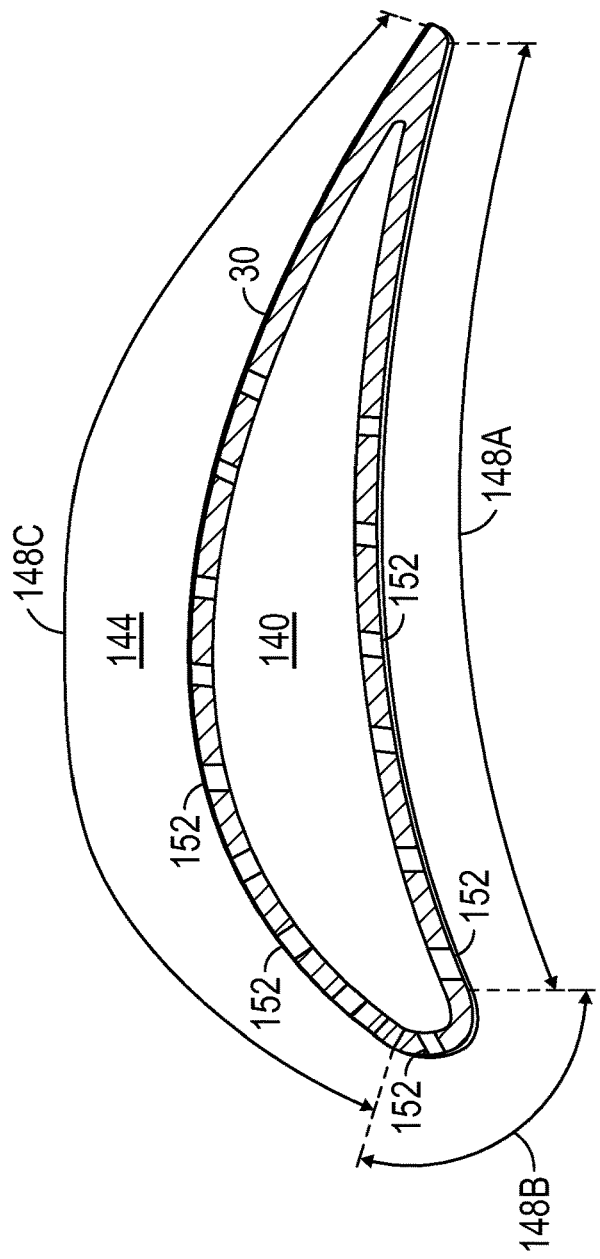
FIG. 3 depicts a sectioned view through an embodiment of a conduit disclosed herein.
Figure 4:
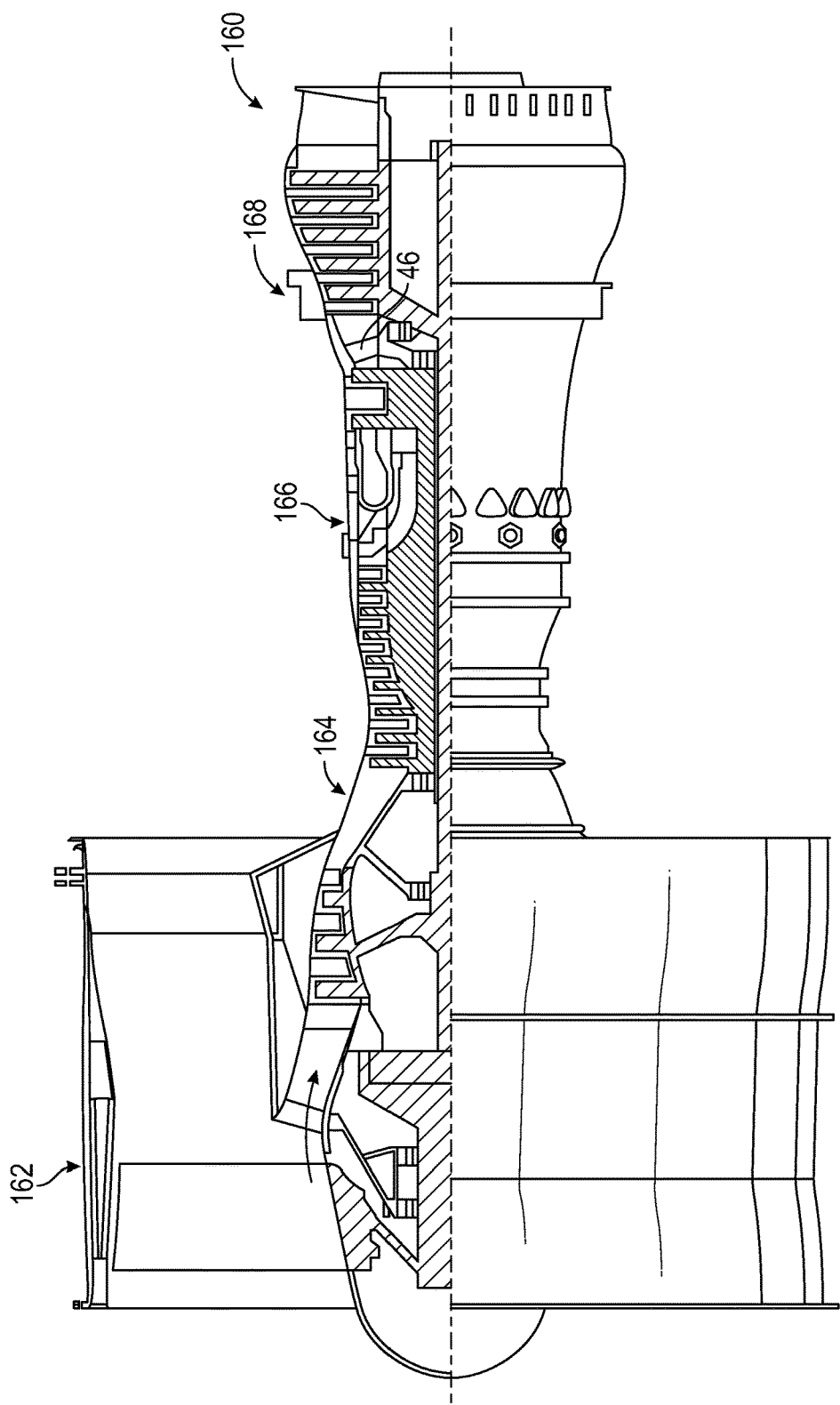
FIG. 4 depicts a schematically illustrated gas turbine engine in which the conduit heat transferring systems of FIGS. 1 and 2 may be employed.

Referring to FIG. 3, in one embodiment the conduit 30 is an airfoil of a gas turbine engine 160 (FIG. 4). Normally heat transferring fluid flows in a direction from an inside 140 to an outside 144 of the airfoil 30 through openings 152. However, in response to changes in operational parameters of the turbine engine, such as changes in flow areas upstream of the airfoil 30 for example, temporal variations in pressure differential between the inside 140 and the outside 144 can occur. In some situations, such as when the airfoil 30 is a first stage blade of the turbine engine, for example, the differences in pressure differential can, at least temporarily, cause an inversion of the pressure gradient from 140 to 144 across the openings 152. Such a condition forces hot gas-path air into the airfoil 30 and can allow for localized increases in temperature in portions 148A-C of the airfoil 30, for example. Embodiments of the conduit heat transferring systems 10, 110 disclosed herein can allow for increased control of pressure supplied to the inside 140 of the airfoil 30 and minimize or prevent reversing of flow through the openings 152.

FIG. 4 depicts a schematically illustrated gas turbine engine 160 in which the conduit heat transferring systems 10 and 110 may be employed. The gas turbine engine 160 illustrated in one embodiment is a two-spool turbofan that generally incorporates a fan section 162, a compressor section 164, a combustor section 166 and a turbine section 168. The fan section 162 drives air along a bypass flowpath while the compressor section 164 drives air along a core flowpath for compression and communication into the combustor section 166 then expansion through the turbine section 168. Although depicted as a turbofan gas turbine engine in the disclosed non-limiting embodiment, it should be understood that the concepts described herein are not limited to use with turbine engines as the teachings may be applied to other types of engines.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

The invention claimed is:

1. A conduit system for a gas turbine engine, comprising:
   a heat exchanger configured to cool or heat fluid flowing therethrough having an inlet and an outlet;
   at least one by-pass in operable communication with the heat exchanger being configured to allow fluid to exit the heat exchanger before reaching the outlet; and
   a conduit being in fluidic communication with the outlet and the at least one by-pass;
   wherein the at least one by-pass is a plurality of by-passes and each of the plurality of by-passes allows fluid to exit the heat exchanger after passing through a different portion of the heat exchanger.

2. The conduit system for a gas turbine engine of claim 1, wherein each of the at least one by-pass is in fluid communication with a respective valve to adjust fluid flow through the at least one by-pass.

3. The conduit system for a gas turbine engine of claim 1, wherein the conduit is a blade of a turbine engine.

4. The conduit system for a gas turbine engine of claim 1, wherein pressure drop between the inlet and the at least one by-pass is less than pressure drop between the inlet and the outlet.

5. The conduit system for a gas turbine engine of claim 1, wherein a change in fluid temperature between the inlet and the at least one by-pass is less than a change in fluid temperature between the inlet and the outlet.

6. The conduit system for a gas turbine engine of claim 1, wherein the conduit is supplied fluid from the outlet and the at least one by-pass.

7. The conduit system for a gas turbine engine of claim 1, wherein pressure of fluid supplied to the conduit prevents reversing of flow through one or more openings in the conduit.

8. The conduit system for a gas turbine engine of claim 1, wherein flow through each of the at least one by-pass can be adjusted independently to allow control over pressure and temperature of fluid supplied to the conduit.

9. A method of supplying heat transferring fluid to a conduit, comprising:
   directing fluid into a heat exchanger;
   directing at least some of the fluid out of the heat exchanger via at least one by-pass prior to traversing completely through the heat exchanger;
   directing at least some of the fluid that flowed out the at least one by-pass into a conduit to be cooled or heated; and
   flowing fluid through a plurality of the at least one by-passes prior to traversing completely through the heat exchanger.

10. The method of supplying heat transferring fluid to a conduit of claim 9, further comprising balancing flow through an at least one exit and an outlet of the heat exchanger according to a desired pressure differential of the fluid being cooled or heated.

* * * * *